United States Patent
Sawayanagi et al.

(10) Patent No.: US 6,558,193 B2
(45) Date of Patent: May 6, 2003

(54) CONNECTOR FITTING STRUCTURE FOR AUXILIARY COMPONENT

(75) Inventors: Masahiro Sawayanagi, Shizuoka-ken (JP); Goro Takahashi, Aichi-ken (JP); Isao Yoneyama, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/024,265

(22) Filed: Dec. 21, 2001

(65) Prior Publication Data

US 2002/0094719 A1 Jul. 18, 2002

(30) Foreign Application Priority Data

Dec. 25, 2000 (JP) .............................. 2000-392797

(51) Int. Cl.⁷ .............................................. H01R 13/66
(52) U.S. Cl. ............................................ 439/545; 439/34
(58) Field of Search ............................... 439/545, 844, 439/855, 939, 544, 34, 567; 296/97.9

(56) References Cited

U.S. PATENT DOCUMENTS

| | | | | |
|---|---|---|---|---|
| 3,878,099 | A | * 4/1975 | Ogle | ........................ 210/198.2 |
| 5,056,853 | A | 10/1991 | Van Order | |
| 5,752,853 | A | 5/1998 | Curtindale | |
| 6,398,173 | B1 * | 6/2002 | Sawayanagi | ................. 248/200 |
| 6,406,087 | B2 * | 6/2002 | Sawayanagi | ................ 296/97.9 |

FOREIGN PATENT DOCUMENTS

EP  1 010 556 A2  6/2000
JP  2000272343  10/2000

OTHER PUBLICATIONS

Search Report issued in the European counterpart application.

* cited by examiner

Primary Examiner—Tho D. Ta
Assistant Examiner—James R. Harvey
(74) Attorney, Agent, or Firm—Finnegan, Henderson, Farabow, Garrett & Dunner, L.L.P.

(57) ABSTRACT

A first connector is fixed to a panel via a first bracket. A second connector is provided with a pair of rails which are brought into sliding engagement with a pair of slots provided to a second bracket, thereby to fix the second connector to the second bracket. The second connector has a body housing a plurality of connection terminals connected to an auxiliary component, a lid connected to the body via a hinge, an engagement member engaging the lid with the body and a connector hood fitted into the first connector. The lid engaged with the body after the connection terminals are housed in the body prevents the connection terminals from being pulled out. The second bracket supports the auxiliary component. The engagement of the second bracket with the first bracket leads to the fitting of the second connector to the first connector, resulting in the auxiliary component fixed to the panel.

4 Claims, 9 Drawing Sheets

CONNECTOR FITTING STRUCTURE FOR AUXILIARY COMPONENT

BACKGROUND OF THE INVENTION

1. Field of the Invention

This invention relates to a fitting structure for fixing an auxiliary component connected to a connector to another connector by interconnecting the two connectors. More particularly, this invention relates to a structure for fitting a sunvisor to a vehicle body provided with a connector.

2. Description of the Related Art

In a vehicle interior, sunvisors for a driver and a passenger seat occupant are provided above a front window. Some sorts of sunvisors are provided with vanity mirrors and/or illumination lamps for nighttime.

FIG. 1 shows such a sunvisor with a lamp provided with a bracket at the distal end of a fixing shaft for fixing the sunvisor to the interior of a vehicle. The bracket is screwed to an inner panel in the vehicle interior.

With reference to FIGS. 1 to 4, a conventional connection structure for fixing a sunvisor to an inner panel will be described. An inner panel has a hole provided above a front window, through which a wiring harness is drawn out into the interior of a vehicle. A connector attached to the front end of the harness is mated with a connector attached to the front end of a wire drawn out from the bracket. The mating of those two connectors requires manual work by a skilled person.

Then, as shown in FIG. 2, the mated connectors and the wiring harness are inserted through the hole formed in the inner panel into a space between the inner panel and an outer panel so as to mount the sunvisor. Specifically, as shown in FIG. 3, with the mated connectors and the harness accommodated in the space, a grommet screw formed in the bracket is inserted into a bracket mounting hole formed in the inner panel as shown in FIG. 3, thereby to push the bracket into the inner panel.

Then, as shown in FIG. 4, a screw is inserted into a central hole of the grommet screw in a cylindrical shape for fastening. The grommet screw has slits at the front end so that it is pushed and expanded by the screw inserted. A plurality of expanded portions of the grommet screw is pressed against an opening periphery of the bracket mounting hole, whereby the bracket is fixed to the inner panel.

SUMMARY OF THE INVENTION

In the above conventional fixing structure, however, it can inadvertently occur that the sunvisor is fixed to the inner panel with incomplete engagement between the connector for the wiring harness and the connector for the sunvisor unnoted. Further, it is necessary to confirm that connection terminals not shown are properly fitted into the respective connectors. Incomplete fitting of the terminals prevents power supply to the lamp. If that is the case, all parts mounted should be demounted and checked to repeat a series of mounting steps. This significantly reduces work efficiency.

According to a first aspect of this invention, there is provided a connector fitting structure for an auxiliary component, which comprises: a first connector held by a first bracket fixed to a panel; a second connector mated with the first connector, the second connector comprising a pair of rails; and a second bracket for supporting the auxiliary component, engaged with the first bracket, the second bracket having a pair of slots engaged with the rails. The rails and the slots extend orthogonal to a mating direction of the first and second connectors, and are brought into sliding engagement with one another. The engagement of the second bracket with the first bracket leads to the fitting of the second connector to the first connector, resulting in the auxiliary component fixed to the panel.

The above structure facilitates the fixing of the second connector to the second bracket, merely requiring lateral slide, and also securely retains the connection between the second connector and the second bracket during mating and demating operations of the connectors.

According to a second aspect of this invention, the second connector further comprises: a body for housing a plurality of connection terminals connected to the auxiliary component; a lid connected to the body via a hinge; an engagement member for engaging the lid with the body; and a connector hood fitted to the first connector. The lid is engaged with the body after the connection terminals are housed in the body, preventing the connection terminals from being pulled out.

The above structure closes the lid to prevent the connection terminals from being pulled out, thereby securely retaining the terminals during mating operation of the connectors. It can be checked whether the connection terminals are retained inside the connector by checking the lid and the engagement member of the body. Further, the above structure secures the connection between the second connector and the second bracket and the retaining of the connection terminals by the second connector during mating and demating operations of the connectors.

According to a third aspect of this invention, the panel constitutes an inner panel of a vehicle passenger compartment; and the first connector and the second connector are mated with one another through an opening provided in a trim fixed to the inner panel. This eliminates the need for introducing wires of the auxiliary component into the inside of the inner panel, thus eliminating difficulties in wiring, and thereby preventing the wires from being caught on the inner panel or other components and damaged.

According to a fourth embodiment of this invention, the auxiliary component constitutes a sunvisor; the second bracket supports an end of a fixing shaft attached to the sunvisor; and the connection terminals are connected to ends of wires led out from the fixing shaft.

This structure applied to such a large auxiliary component as the sunvisor facilitates electrically connecting the sunvisor to the panel.

DETAILED DESCRIPTION OF THE PREFERRED EMBODIMENT

A preferred embodiment of this invention will be described below with reference to FIGS. 5 to 12. In this embodiment, the invention is applied to a bracket interconnection structure for fixing a sunvisor as an auxiliary component to an inner panel fixed above a front window in front of a driver seat or a passenger seat.

Figure 1:
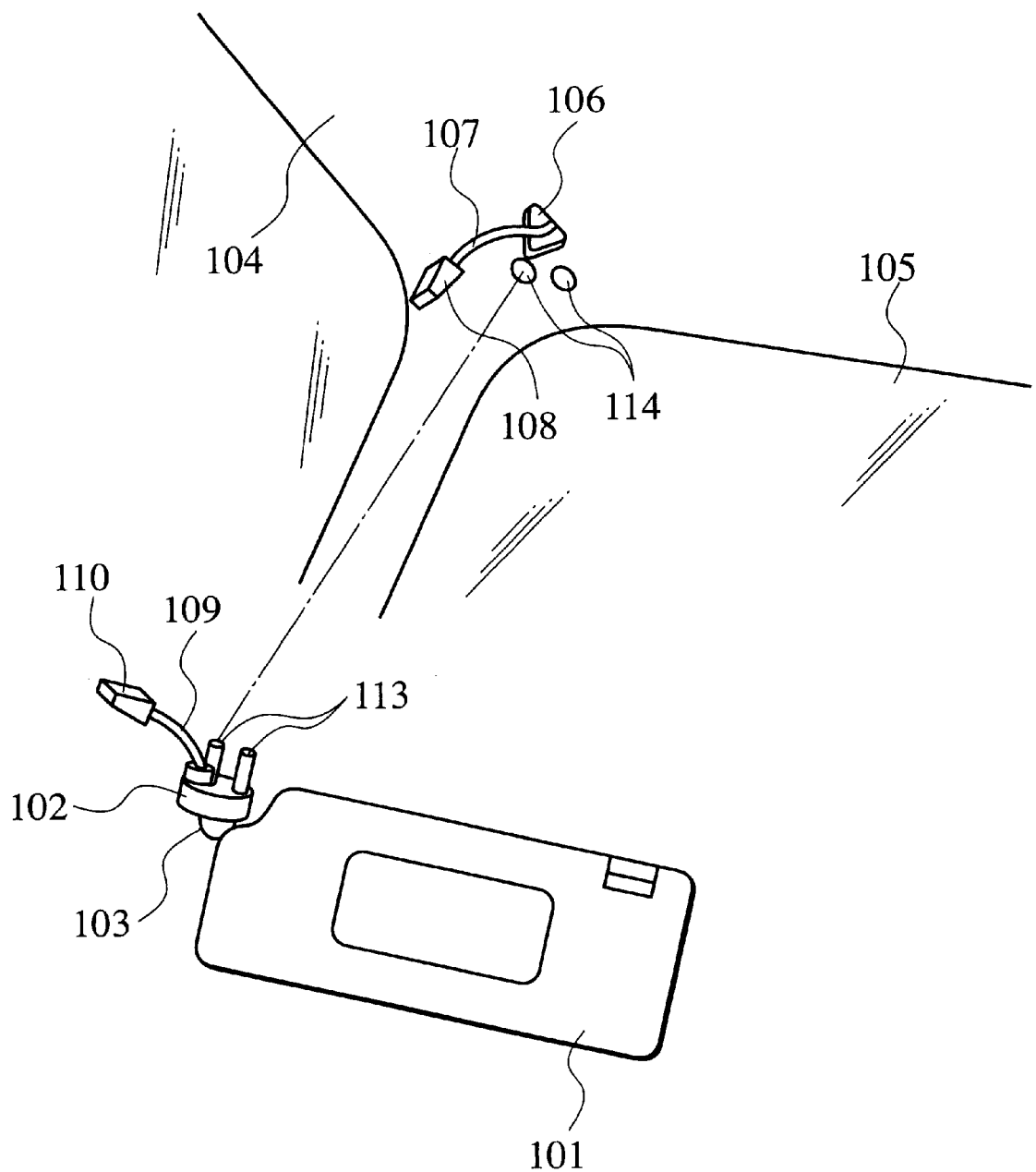
FIG. 1 shows a connector and an inner panel according to a conventional fitting structure.
Figure 2:
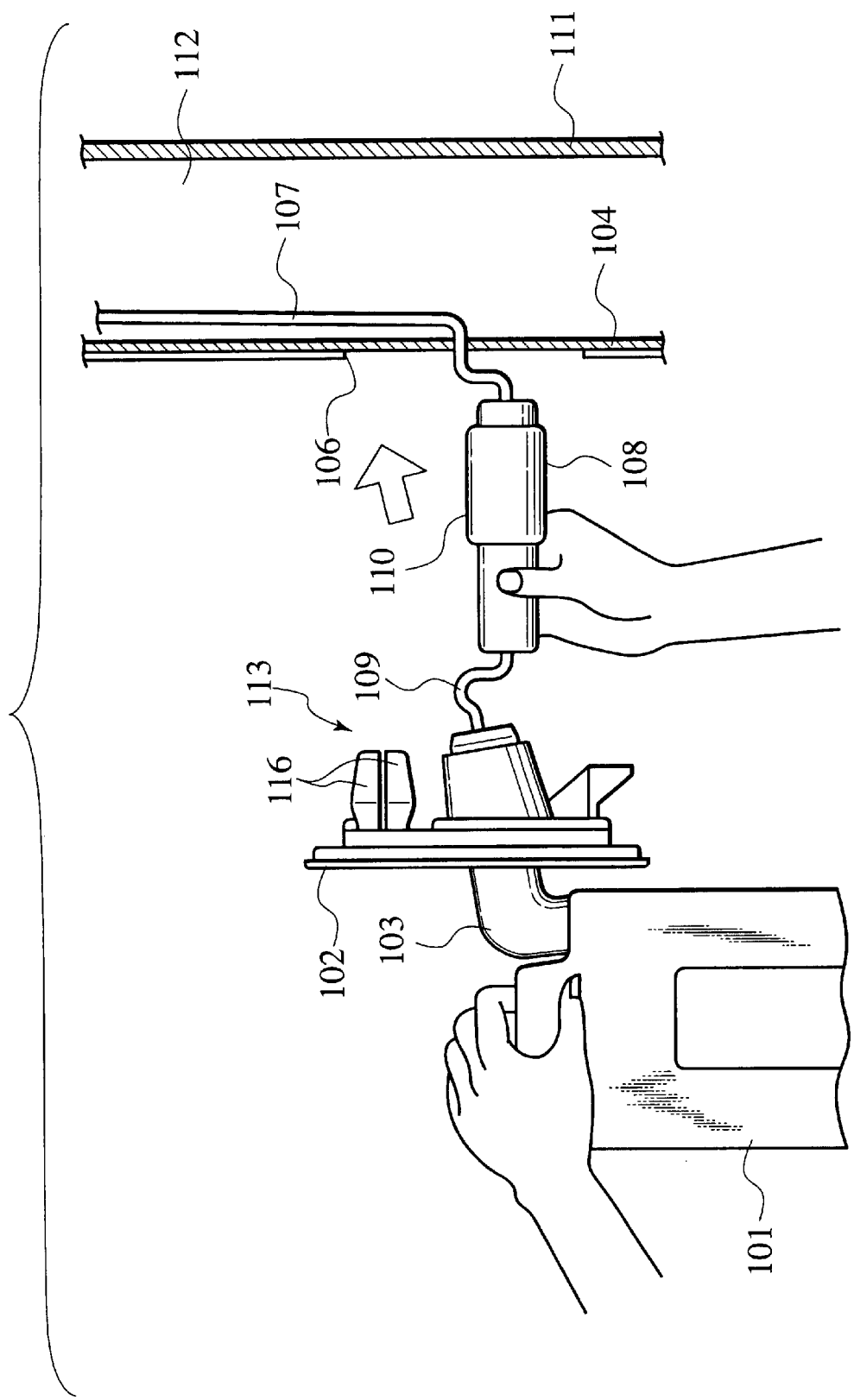
FIG. 2 is a cross-sectional view illustrating a step of fitting the connector to the inner panel according to the conventional fitting structure.
Figure 3:
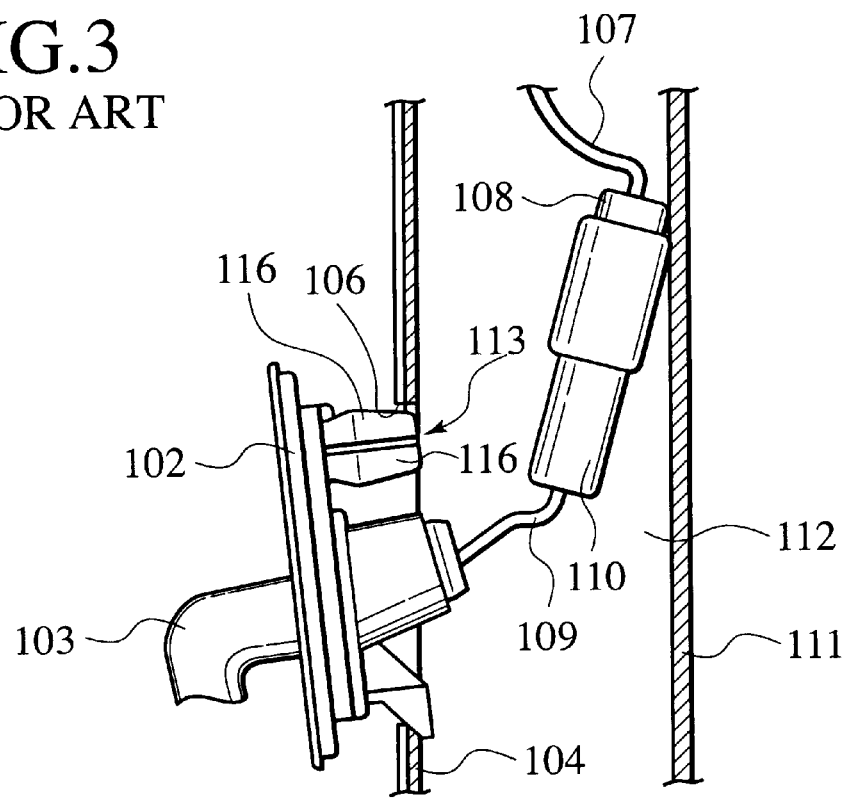
FIG. 3 is a cross-sectional view illustrating a step of fitting the connector to the inner panel according to the conventional fitting structure.
Figure 4:
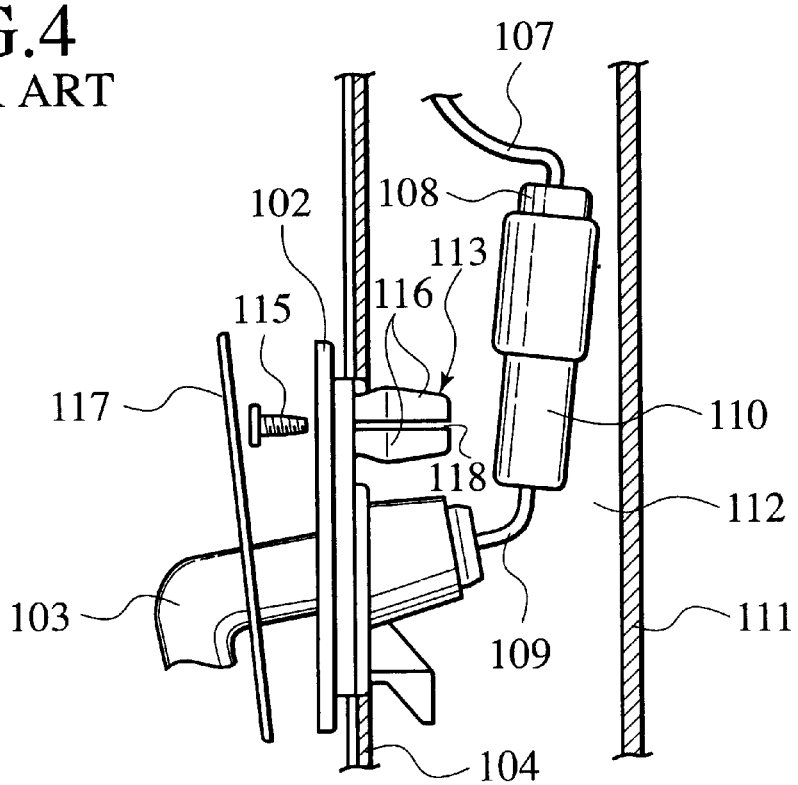
FIG. 4 is a cross-sectional view illustrating a step of fixing a bracket to the inner panel according to the conventional fitting structure.
Figure 5:
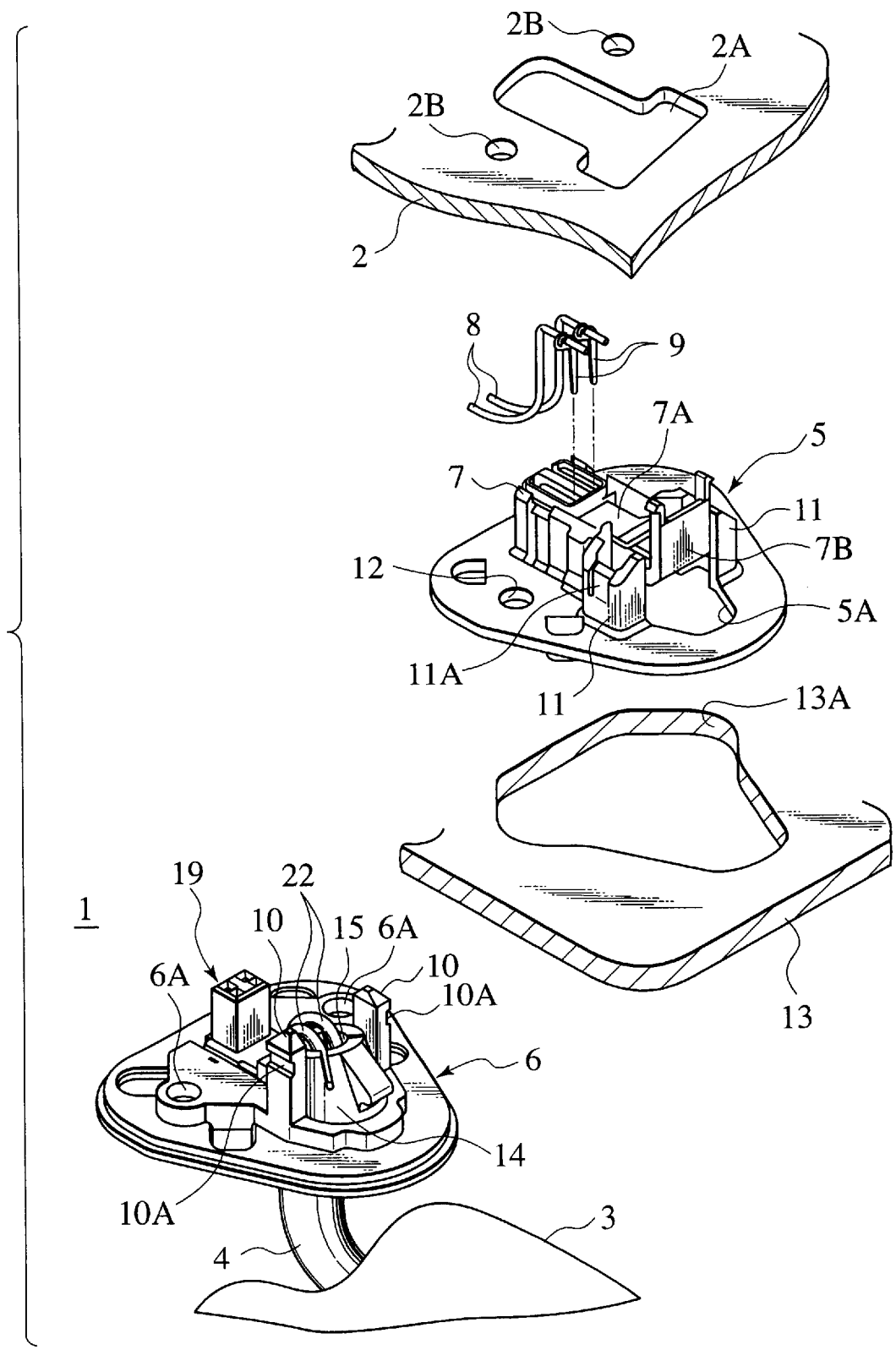
FIG. 5 is an exploded perspective view illustrating a connector fitting structure for an auxiliary component according to an embodiment of this invention.

As shown in FIG. 5, a bracket 1 to be mounted to a vehicle body according to the embodiment is a device for fixing a sunvisor 3 to an inner panel 2 of a vehicle, attached to the front end of a fixing shaft 4 supporting the sunvisor 3. The bracket 1 includes a first bracket 5 and a second bracket 6.

First Bracket

The first bracket 5 to be mounted to the inner panel of the vehicle is provided with a first connector 7 as shown in FIG. 5. The first connector 7 is formed in an upwardly protruding manner on the first bracket 5 and is provided at its bottom with a connection opening (not shown) for receiving a second connector 19 to be described later. A first connection terminal 9 fitted onto an end of a wiring harness 8 from a vehicle body as shown in FIG. 5 is housed and fixed in the first connector 7. A cover 7B is attached to the first connector 7 via a hinge 7A. With the cover 7B put over the first connector 7 for engagement, the first terminal 9 is retained inside.

The first bracket 5 is further provided with a pair of tubular engagement members 11 for engagement with a pair of engagement protrusions 10 provided to a second bracket 6 described later. Each engagement member 11 has at its bottom an opening for receiving the engagement protrusion 10. An insertion hole 5A for insertion of a shaft holding member 14 of the second bracket 6 to be described later is provided between the engagement members 11.

Each engagement member 11 has a flexible locking arm 11A. The first bracket 5 is further provided with a pair of mounting holes 12 for insertion of grommet screws not shown.

Inner Panel

The first bracket 5 is fixed to the inner panel 2. The inner panel 2 has an opening 2A provided for insertion of the protruded first connector 7 and the pair of engagement members 11. The inner panel 2 further has a pair of mounting holes 2B positioned correspondingly to the mounting holes 12 of the first bracket 5.

Second Bracket

The second bracket 6 is, as shown in FIG. 5, fixed to the first bracket 5 with a trim 13 to be fixed to the inner panel 2 for interior decoration interposed therebetween. The second bracket 6 has the shaft holding member 14 for holding the front end of the fixing shaft 4. The shaft holding member 14 has in the center a substantially cylindrical shaft holding hole 15 for receiving the fixing shaft 4.

Figure 6:
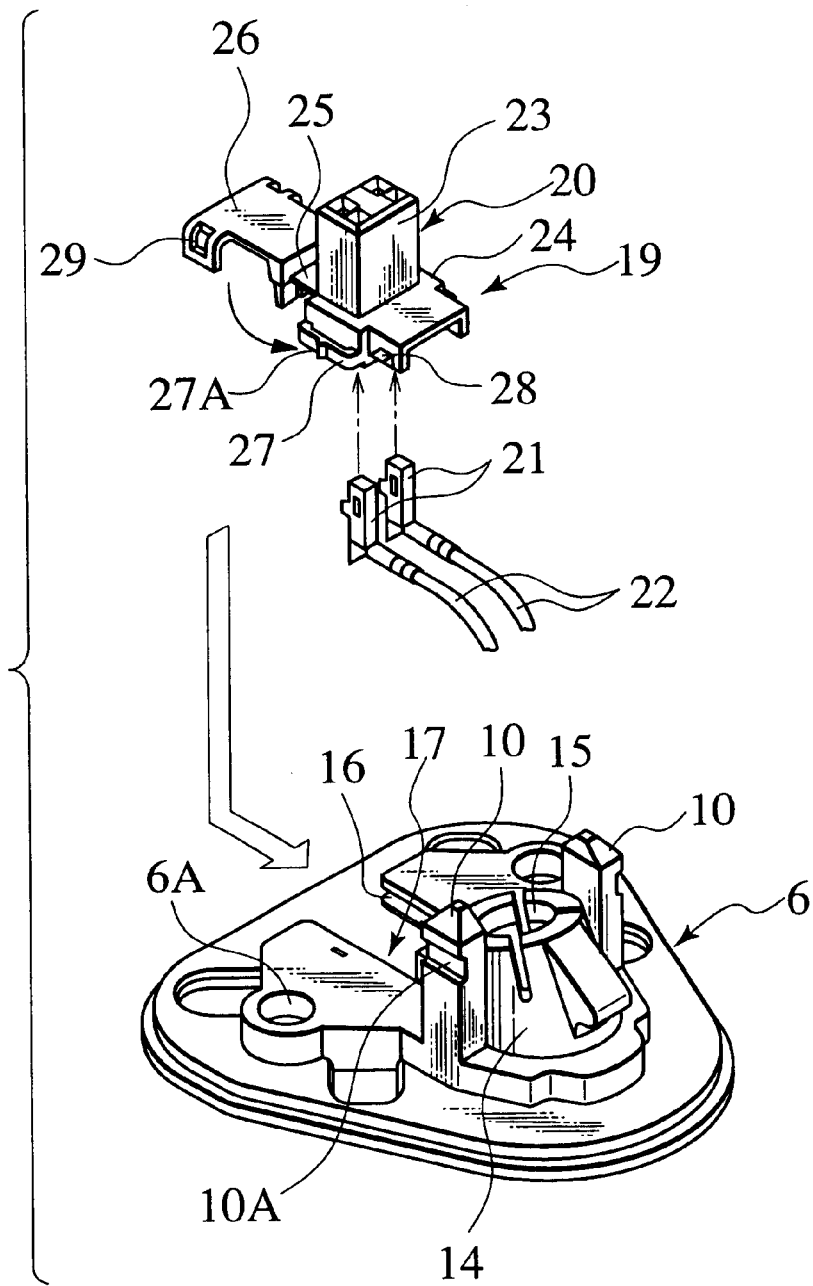
FIG. 6 is an exploded perspective view illustrating a second bracket and a second connector according to the embodiment of this invention.
Figure 7:
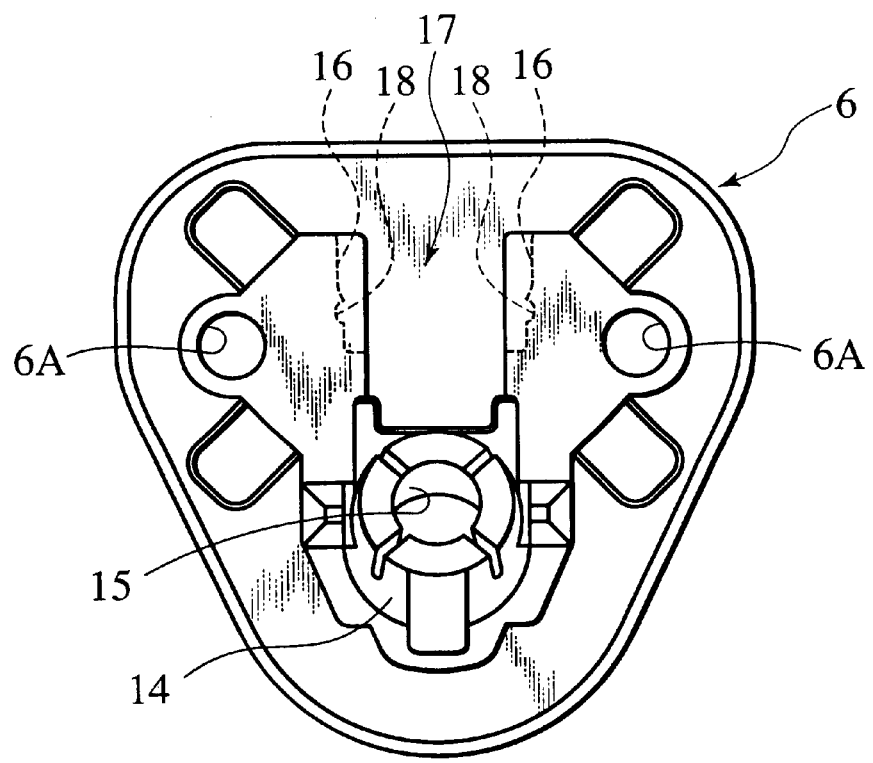
FIG. 7 is a plan view of the second bracket according to the embodiment of this invention.
Figure 8:
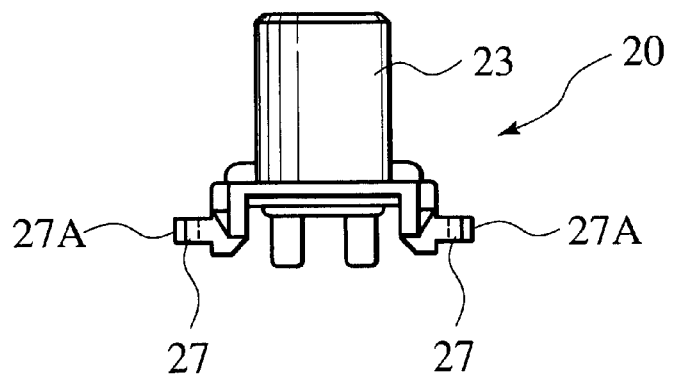
FIG. 8 is a front view of a connector housing of the second connector according to the embodiment of this invention.
Figure 9:
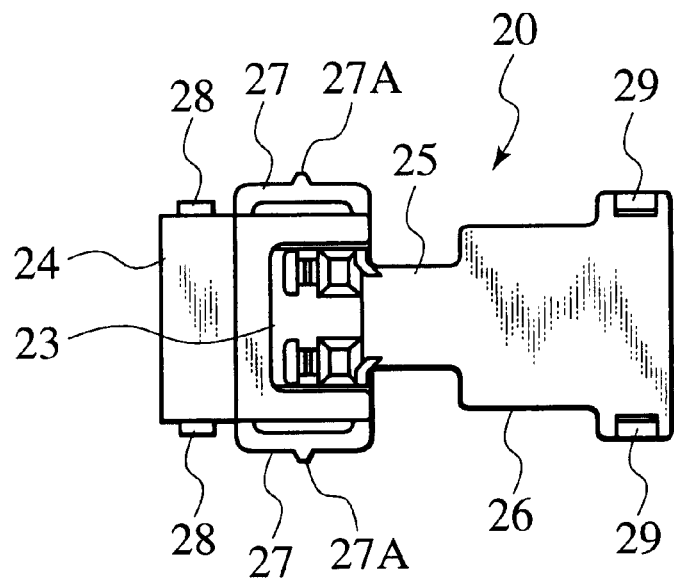
FIG. 9 is a plan view of the connector housing of the second connector according to the embodiment of this invention.
Figure 10:
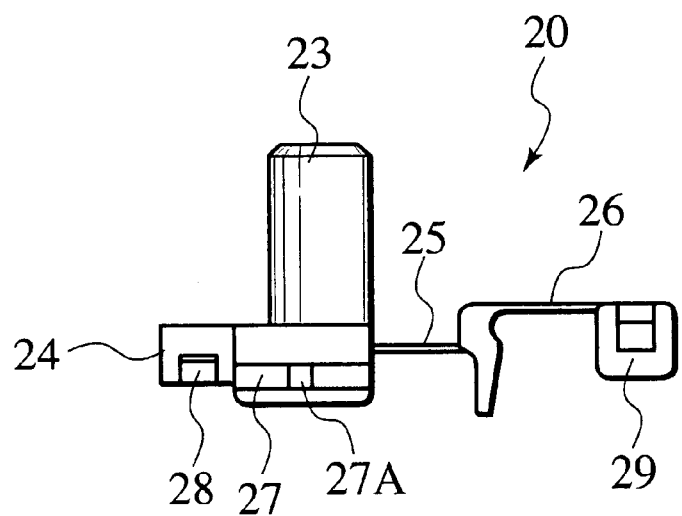
FIG. 10 is a side view of the connector housing of the second connector according to the embodiment of this invention.
Figure 11:
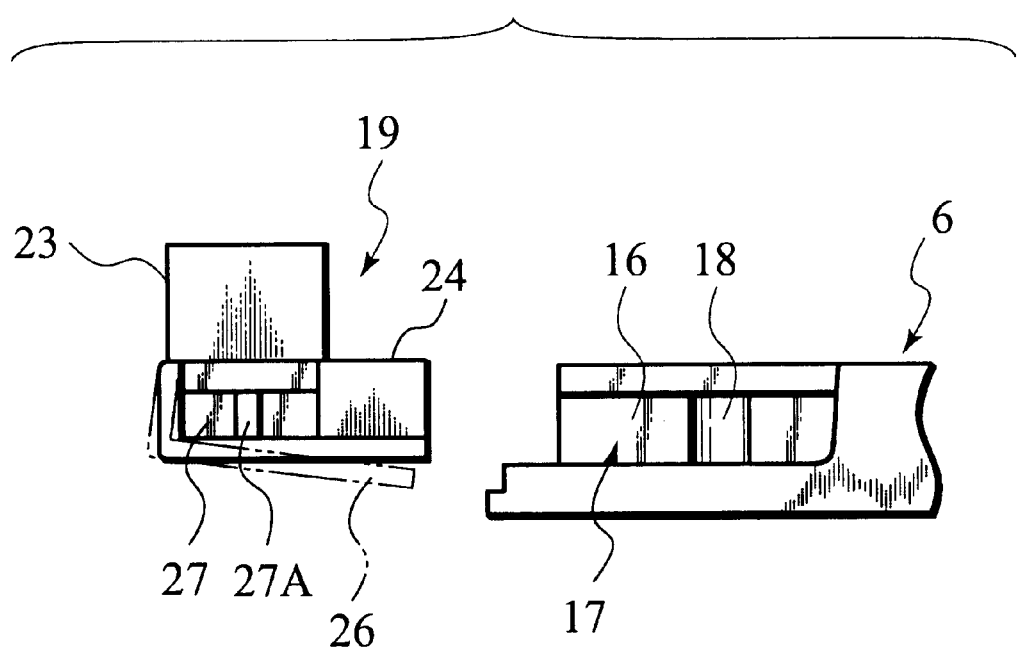
FIG. 11 is a side view illustrating the second connector and the second bracket before being fitted to one another according to the embodiment of this invention.
Figure 12:
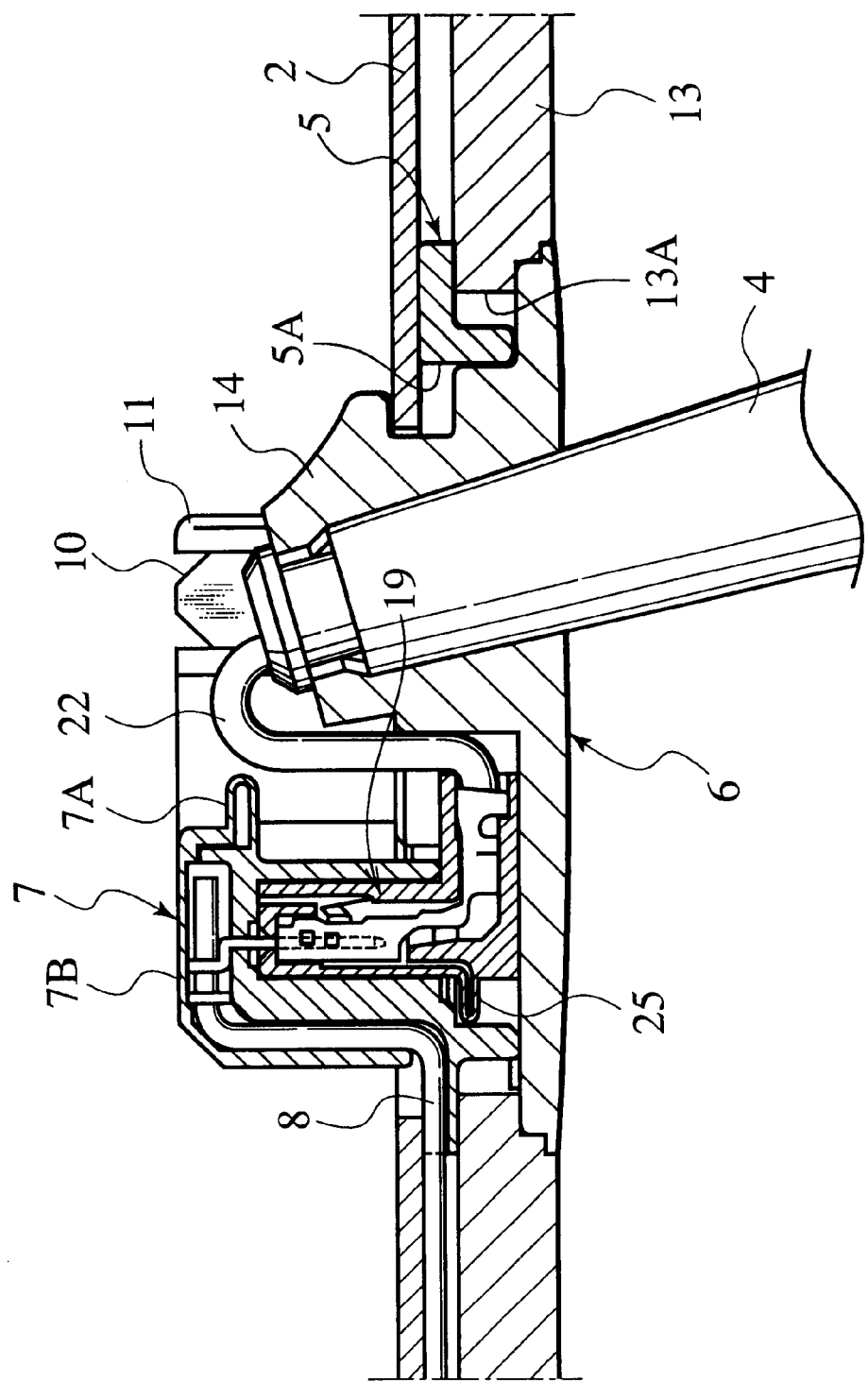
FIG. 12 is a cross-sectional view illustrating a mated state of a first connector and the second connector according to the embodiment of this invention.

The second bracket 6 has, as shown in FIGS. 6 and 7, a connector fixing section 17 with two opposite slots 16 extending in a parallel relationship in the plane direction of the bracket. Each slot 16 has a locking recess 18 formed in the middle. The second connector 19 is slid laterally into the fixing section 17 as shown in FIG. 5.

The two engagement protrusions 10 are formed in an upwardly protruding manner on opposite sides of the shaft holding member 14. The protrusions 10 extend to a higher level than the second connector 19. Thus, in connecting the second bracket 6 to the first bracket 5, the engagement protrusions 10 are inserted into the respective engagement members 11 of the first bracket 5 before the second connector 19 is fitted into the first connector 7. Each engagement protrusion 10 is formed with a groove 10A in an upper side surface for engagement with a free end of the locking arm 11A. The upper portion of the engagement protrusion 10 is in a quadrangular prism or circular cone shape. The upper portion in such a shape guides the protrusion 10 into the engagement member 11 during insertion. This allows reliable connecting operation of the first and second brackets 5 and 6.

The second bracket 6 also has a mounting hole 6A provided on each side of the inserted position of the second connector 19. The mounting hole 6A corresponds in position to the mounting hole 12 of the first bracket 5 and the mounting hole 2B of the inner panel 2.

Second Connector

The second connector 19 has, as shown in FIG. 6, a connector housing 20 and a pair of second connection terminals 21 housed in the housing 20. The second terminals 21 are connected to ends of a pair of wires 22 from the sunvisor, led out from the end of the fixing shaft 4 inserted into the shaft holding member 14 of the second bracket 6.

The connector housing 20 consists, as shown in FIG. 6 and FIGS. 8 to 10, of a body 24 having a second connector hood 23 for insertion of the second terminals 21 from the bottom, and a lid 26 attached to the body 24 via a hinge 25. The lid 26 is turned on the hinge 25 to cover the bottom of the body 24.

The body 24 has, at its opposed sidewalls, a pair of rails 27 to be inserted into the slots 16 of the second bracket 6. Each rail 27 is a flexible arm and is fixed at the opposite ends to the sidewall of the body 24. A locking protrusion 27A extending laterally outward of the body 24 is formed substantially in the middle of each rail 27.

The body 24 also has, at its opposite sidewalls, engagement protrusions 28. The lid 26 has engagement parts 29 positioned correspondingly to the engagement protrusions 28. The engagement parts 29 engage with the respective engagement protrusions 28 when the lid 26 is turned on the hinge 25 to be laid on the bottom of the body 24.

Effects

In the connector housing 20 of the above-described structure, the second connection terminals 21 are inserted from below and held in the connector hood 23, and the lid 26 is turned on the hinge 25 onto the body 24 so as to engage the engagement parts 29 with the engagement protrusions 28, whereby the second terminals 21 are guided to and fixed in the appropriate positions inside the connector hood 23.

With the body 24 and the lid 26 engaged with one another, the rails 27 are inserted into the slots 16 of the second bracket 6. That is, the connector housing 20 cannot be fixed to the second bracket 6 until the second terminals 21 are housed appropriately in the connector hood 23. Once the second connector 19 is fixed to the second bracket 6, the lid 26 never opens, which eliminates the possibility of erroneous pulling out of the second terminals 21 or disengagement of the lid 26.

In the course of fitting the second bracket 6 to the first bracket 5, the first bracket 5 is interposed between the inner panel 2 and the trim 13 with the first connector 7 and the engagement parts 11 protruded outside of the opening 2A of the inner panel 2, and the second connector 19, the engagement protrusions 10 and the shaft holding member 14 on the second bracket 6 are opposed through an opening 13A of the trim 13 to the first bracket 5 for assemblage. Since the upper portion of the engagement protrusion 10 is in a quadrangular prism shape, the protrusion 10 is appropriately guided into the opening provided at the bottom of the engagement member 11 of the first bracket 5, and is fitted into the member 11.

With a greater height than that of the second connector 19, the engagement protrusions 10 are inserted into the respective engagement members 11 of the first bracket 5 before the second connector 19 is fitted into the first connector 7 in the course of connecting the second bracket 6 to the first bracket 5. The top ends of the locking arms 11A of the engagement members 11 are engaged with the grooves 10A formed in the side surfaces of the engagement protrusions 10, thereby bringing the brackets 5 and 6 into preliminary engagement.

Finally, a bracket case not shown is attached from below the second bracket 6, completing the fixing of the sunvisor 3 as an auxiliary component to the inner panel 2. The bracket case has screw grommets to be inserted into the mounting holes 6A, 12 and 2B.

The preferred embodiment of this invention has been described above, which is not intended to limit this invention to the above embodiment. The above disclosure enables those of ordinary skill in the art to perform this invention through modifications or variations of the embodiment. For example, this invention can be applied to a device such as a room lamp as well as a sunvisor as illustrated in the above embodiment.

What is claimed is:

1. A connector fitting structure for an auxiliary component, comprising:
   a first connector held by a first bracket fixed to a panel;
   a second connector mated with the first connector, the second connector comprising a pair of rails; and
   a second bracket for supporting the auxiliary component, engaged with the first bracket, the second bracket having a pair of slots engaged with the rails; wherein,
   the rails are slid into the slots in a direction substantially orthogonal to a mating direction of the first connector and the second connector so as to fix the second connector to the second bracket; and
   the engagement of the second bracket with the first bracket leads to the fitting of the second connector to the first connector; whereby,
   the auxiliary component is fixed to the panel.

2. A connector fitting structure for an auxiliary component as set forth in claim 1, wherein:
   the second connector further comprising:
   a body for housing a plurality of connection terminals connected to the auxiliary component;
   a lid connected to the body via a hinge;
   at least one engagement member for engaging the lid with the body; and
   a connector hood fitted to the first connector, protruding in a fitting direction to the first connector; wherein,
   the pair of rails are extended substantially orthogonal to the protruding direction of the connector hood; and
   the lid is engaged with the body via the engagement member after the connection terminals are housed in the body, thereby retaining the connection terminals inside the body.

3. A connector fitting structure for an auxiliary component according to claim 1, wherein:
   the panel constitutes an inner panel of a vehicle passenger compartment; and
   the first connector and the second connector are mated with one another through an opening provided in a trim fixed to the inner panel.

4. A connector fitting structure for an auxiliary component according to claim 1, wherein:
   the auxiliary component constitutes a sunvisor;
   the second bracket supports an end of a fixing shaft attached to the sunvisor; and
   the connection terminals are connected to ends of wires led out from the fixing shaft.

\* \* \* \* \*